United States Patent
Redlingshöfer et al.

(10) Patent No.: US 7,833,508 B2
(45) Date of Patent: Nov. 16, 2010

(54) REACTION VESSEL AND PROCESS FOR ITS USE

(75) Inventors: Hubert Redlingshöfer, Münchsteinach (DE); Jan-Olaf Barth, Frankfurt (DE); Caspar-Heinrich Finkeldei, Alzenau (DE); Hans Joachim Hasselbach, Gelnhausen (DE); Stephan Kretz, Biebergemünd (DE); Harald Heinzel, Altenstadt-Oberau (DE); Christoph Weckbecker, Gründau-Lieblos (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/501,114

(22) Filed: Jul. 10, 2009

(65) Prior Publication Data

US 2010/0015037 A1 Jan. 21, 2010

(30) Foreign Application Priority Data

Jul. 18, 2008 (DE) .................. 10 2008 040 544

(51) Int. Cl.
*B01J 10/00* (2006.01)
*C01B 17/16* (2006.01)

(52) U.S. Cl. ................ 423/563; 423/564; 423/565; 422/129; 422/161

(58) Field of Classification Search ............. 423/563, 423/564, 565; 422/129, 161
See application file for complete search history.

(56) References Cited

U.S. PATENT DOCUMENTS 2,876,070 A 3/1959 Roberts, Jr.
2,876,071 A 3/1959 Updergraff
4,094,961 A 6/1978 Beavon
5,686,056 A * 11/1997 Kimtantas ................ 423/562

FOREIGN PATENT DOCUMENTS

| CS | 190792 | 9/1978 |
|----|--------|--------|
| CS | 190793 | 9/1978 |
| DE | 558 432 | 9/1932 |
| DE | 1193040 | 5/1970 |
| EP | 0 339 818 | 11/1989 |
| GB | 1193040 A | 5/1970 |

OTHER PUBLICATIONS

Glaser et al. (1991) "Auswertung von Daten zum $H_2S$-Angriff auf Stähle bei verschiedenen Temperaturen und Konzentrationen" Werkstoffe und Korrosion 42:374-376.
PCT Notification of Transmittal of the International Search Report and the Written Opinion of the International Searching Authority or the Declaration (Form PCT/ISA/220) received in PCT/EP2009/058388 mailed Oct. 27, 2009.
PCT International Search Report (Form PCT/ISA/210) received in PCT/EP2009/058388 mailed Oct. 27, 2009.
PCT Written Opinion of the International Searching Authority (Form/ISA/237) received in PCT/EP2009/058388 mailed Oct. 27, 2009.

* cited by examiner

*Primary Examiner*—Timothy C Vanoy
(74) *Attorney, Agent, or Firm*—Smith, Gambrell & Russell, LLP

(57) ABSTRACT

The invention relates to a reaction vessel in which hydrogen sulphide is prepared from sulphur and hydrogen, wherein the reaction vessel consists partly or entirely of a material which is resistant to the reaction mixture, its compounds or elements and retains its resistance even at high temperatures.

18 Claims, 1 Drawing Sheet

REACTION VESSEL AND PROCESS FOR ITS USE

INTRODUCTION AND BACKGROUND

The invention relates to a reaction vessel suitable for carrying out an exothermic reaction of a liquid reactant with a gaseous reactant to form a gaseous reaction product at elevated temperature and elevated pressure, wherein the residence time of the gaseous reactant in the reaction vessel is increased by non-pressure-bearing internals.

Such a reaction vessel is preferably used for preparing hydrogen sulphide from sulphur and hydrogen. The reaction vessel contains internals which increase the residence time of the hydrogen in the liquid sulphur, with the gas being collected in parts of these internals and subsequently being dispersed again in the liquid sulphur.

Hydrogen sulphide in particular is an industrially important intermediate, for example for the synthesis of methyl mercaptan, dimethyl sulphide, dimethyl disulphide, sulphonic acids, dimethyl sulphoxide, dimethyl sulphone and for numerous sulphiding reactions. It is nowadays obtained predominantly from the refining of petroleum and natural gas and also by reaction of sulphur and hydrogen.

The synthesis of hydrogen sulphide from the elements hydrogen and sulphur is usually carried out by introduction of hydrogen into the liquid sulphur and subsequent reaction in the gas phase in a downstream reaction space. Both catalysed and uncatalysed processes are known here. The synthesis of hydrogen sulphide is usually carried out in the gas phase at temperatures of from 300 to 600° C. and pressures of from 1 to 30 bar. The industrial production of hydrogen sulphide from the elements proceeds, according to Ullmann's Encyclopedia of Industrial Chemistry, Wiley-VCH, 2002, at temperatures of 450° C. and a pressure of 7 bar.

GB 1193040 describes the uncatalysed synthesis of hydrogen sulphide at relatively high temperatures of from 400 to 600° C. and pressures of from 4 to 15 bar. It is stated that the temperature required is determined by the pressure at which the synthesis is to be carried out. According to that text, about 500° C. is required at a pressure of 9 bar.

An important factor in the preparation of hydrogen sulphide from sulphur and hydrogen is, in particular, the temperature conditions. High temperatures are necessary to achieve an equilibrium state in which a molar ratio of hydrogen:sulphur of about 1:1 is established in the gas phase. Only this makes the synthesis of pure hydrogen sulphide possible. As the pressure increases, the temperature has to be increased greatly corresponding to the vapour pressure curve of sulphur in order to achieve the desired molar ratio of 1:1 in the gas phase. Even small differences in pressure of, for example, 1 bar or less are of great importance.

CSSR 190792 describes a process variant for the preparation of hydrogen sulphide, in which high reaction temperatures are avoided by means of a comparatively complicated arrangement of a plurality of reactors in series. High temperatures are specifically avoided there because of corrosion problems. CSSR 190793 reports severe corrosion of the plant at temperatures of 400° C. upwards.

U.S. Pat. No. 4,094,961, too, reports severe corrosion at temperatures of from 440 to 540° C. in the synthesis of hydrogen sulphide. The synthesis is therefore carried out there at temperatures below 440° C.

The article by B. Glaser, M. Schütze, F. Vollhardt on "Auswertung von Daten zum $H_2S$-Angriff auf Stähle bei verschiedenen Temperaturen und Konzentrationen", Werkstoffe und Korrosion 42, 374-376, 1991, states that in the case of plants in which corrosive attack by $H_2S$ is to be feared at elevated temperatures, this is significantly hindering the further development of such plants. In particular, a move to higher temperatures and thus an improvement in the economics of the corresponding processes has hitherto been ruled out since in this case tremendous corrosion damage and thus downtime of the plants occurs even after short times. The temperature and the $H_2S$ concentration are named as main factors influencing the corrosion.

Depending on the further use of hydrogen sulphide, it can be highly advantageous to provide the hydrogen sulphide at relatively high pressure and not have to compress it separately.

The economics of the process requires very low capital and operating costs. Here, major cost factors are, in particular, the outlay for apparatuses and machinery and also the energy consumption for the synthesis and treatment of the starting gas mixture. For example, operation of compressors and of heating and cooling circuits consumes a large amount of electric power.

SUMMARY OF THE INVENTION

It is an object of the invention to provide a reaction vessel and a process for the preparation of hydrogen sulphide from sulphur and hydrogen at pressures of >5 bar without severe corrosion of pressure-bearing parts occurring as a result of high temperatures.

The invention provides a reaction vessel suitable for carrying out an exothermic reaction of a liquid reactant with one or more gaseous reactants, in particular one gaseous reactant, to form a gaseous reaction product at elevated temperature and elevated pressure, wherein the residence time of the gaseous reactant or reactants in the reaction vessel is increased by non-pressure-bearing internals.

It will be clear to a person skilled in the art that the liquid reactant generally goes over into the gaseous state before the reaction. The non-pressure-bearing internals are surrounded by the liquid reactants.

In the context of the preparation of hydrogen sulphide, the internals increase the residence time, in particular of the hydrogen in the liquid sulphur. The gaseous reactant or reactants is/are at least partly collected in these internals and subsequently become dispersed again in the liquid sulphur, if they have not been converted into hydrogen sulphide.

During the bubbling of hydrogen into liquid sulphur, the hydrogen becomes saturated with gaseous sulphur and is converted into hydrogen sulphide in a strongly exothermic reaction in the gas phase. This can be accelerated by means of a catalyst or can also be carried out without catalyst at significantly higher temperatures. To transfer sufficient sulphur into the gas phase even at high pressure and achieve complete conversion of hydrogen, high temperatures, preferably above 400° C., are necessary. However, the exothermic nature of the reaction produces so much heat that, according to the prior art, at a temperature of the liquid sulphur of about 400° C., temperatures significantly above 450° C. occur locally in reactor regions above the liquid sulphur. These lead to great stresses on the materials and corrosion and make technically complicated cooling necessary.

Reactor concepts which help avoid high overtemperatures on pressure-bearing parts have now been found for such exothermic syntheses at elevated pressure. At the same time, local overtemperatures in the region of the internals are utilized in a targeted manner to make rapid and complete reaction of the hydrogen with a high space-time yield possible. In addition, this reactor concept allows the heat of reaction to be utilized for heating and vaporization of the starting materials, here sulphur. In this way, the starting materials themselves can be utilized for heat integration.

As a result of the inventive arrangement of non-pressure-bearing internals, the sulphur-saturated hydrogen which is finely dispersed in the liquid sulphur phase is collected again there as contiguous gas phase. The residence time of the gaseous reactants in these gas collection regions or gas capture structures is significantly increased, i.e. by a factor of from about 3 to 20, in particular 5 to 15, compared to the residence time of ascending gas bubbles in reactors without internals. If the residence time of the hydrogen in the liquid sulphur is too short, hydrogen enriched with gaseous sulphur collects in the region above the liquid sulphur in the reactor and reacts to form hydrogen sulphide. It follows from this that reaction vessels without the internals according to the invention become heated strongly above the liquid sulphur by the heat liberated since the energy cannot be removed satisfactorily. According to the invention, no reaction mixture enters the space above the liquid sulphur because of the increased residence time in the region of the reactor which is filled with liquid sulphur. According to the invention, the heat liberated therefore leads to an increase in temperature to above 450° C. only within the gas collection regions or gas capture structure where the increased temperature promotes the reaction and the vaporization of sulphur. Due to the local limitation of the reaction and thus the overtemperatures which arise in the region of the internals, the entire pressure-bearing reaction vessel and in particular the region above the liquid sulphur is not heated to temperatures of >450° C. and damage to the material caused by these elevated temperatures is thus avoided. According to the invention, the collection and dispersion of the gas phase within a reaction vessel can occur once or preferably more than once as a result of the arrangement of the internals. In particular, from 3 to 100, preferably from 3 to 50, gas collection regions are arranged above one another. Gas distributors can be installed in between.

The residence time of the gaseous reactants hydrogen and sulphur, in particular of hydrogen, in an internal acting as gas collection region or gas capture region is preferably from >0.5 s to 60 s, particularly preferably from 2 to 60 s, in particular from 3 to 30 s. The temperatures prevailing in the gas collection regions or the internals can be more than 550° C. These temperatures would not be tolerable for the pressure-bearing outer wall for corrosion and safety reasons. If a plurality of gas capture structures are arranged in a reaction vessel, they are preferably arranged in the flow direction of the ascending hydrogen. The size of the gas collection or gas capture volumes of the individual internals can increase, decrease or remain constant. Preference is given to an increase in the collection volumes in the flow direction in order to compensate for the reaction time which slows with the reduction in, for example, the hydrogen concentration in the hydrogen/sulphur gas mixture by an increased residence time.

To avoid temperatures above 450° C. on the pressure-bearing walls of the vessel due to the exothermic nature of the reaction, the internals are surrounded by liquid sulphur. The gas collection regions and associated internals are cooled by the surrounding liquid sulphur.

In a preferred embodiment of the invention, a flow distribution of the liquid reactant, in particular of the sulphur, which makes circulation of the sulphur and thus good heat distribution possible is realized. In particular, attention is paid to a circulation of sulphur in the liquid-filled space between the internals and the pressure-bearing outer wall. The circulation and heat balance in the reactor can also be controlled in a targeted manner by the place at which the fresh sulphur is introduced and/or by recirculation of unreacted sulphur. The sulphur feed and recycle streams are preferably used for cooling the inside of the pressure-bearing outer wall and for cooling the product gas.

The gas collection regions or gas capture regions and associated internals are preferably fixed on one or more internal tubes and are static in the pressure vessel. Manufacture and assembly of the reaction vessel are carried out using methods known to those skilled in the art, for example welding.

In this context, it is likewise possible to use suitable additional materials for surface treatment or the joining of components, for example additional welding materials. The use of special materials or ceramics is also advantageous here because of the high temperatures. If conventional stainless steel is used for the gas capture structures, this is preferably employed there with a corrosion supplement of more than 1 mm.

In a preferred embodiment of the invention, the internals are installed so that they can be pulled out of the reactor from the top, for example with the aid of a crane.

The invention provides a process for the exothermic reaction of a liquid reactant with one or more gaseous reactants to form a gaseous reaction product at elevated temperature and elevated pressure in a reaction vessel, wherein the residence time of the gaseous reactant(s) in the reaction vessel is increased by non-pressure-bearing internals and the non-pressure-bearing internals are surrounded by the liquid reactant.

The invention likewise provides the preparation of hydrogen sulphide from hydrogen and sulphur at elevated pressure and high temperatures using the reaction vessel of the invention.

The temperatures in the synthesis of hydrogen sulphide are in the range from 300 to 600° C., in particular from about 400 to 600° C. At the pressure-bearing parts of the reaction vessel, the temperature is below the temperature which is established at the internals, preferably not greater than 450° C., particularly preferably less than 450° C. Temperatures above 450° C., in particular up to 600° C., preferably prevail in the gas collection regions or gas capture regions or the internals.

The surfaces of the reactor which are not covered with liquid sulphur are preferably located above the liquid sulphur and are not heated to temperatures above 450° C.

The shape of the reaction vessel and the internals is not subject to any particular restrictions. The vessel preferably has a cylindrical shape. The non-pressure-bearing internals acting as gas collection regions or gas capture regions can, for example, be present in the form of upturned cups or caverns, plate constructions with gas collectors and gas distributors, beds of packing elements or hollow bodies, packings, monoliths, knitteds or combinations thereof.

DETAILED DESCRIPTION OF THE INVENTION

Figure 1:
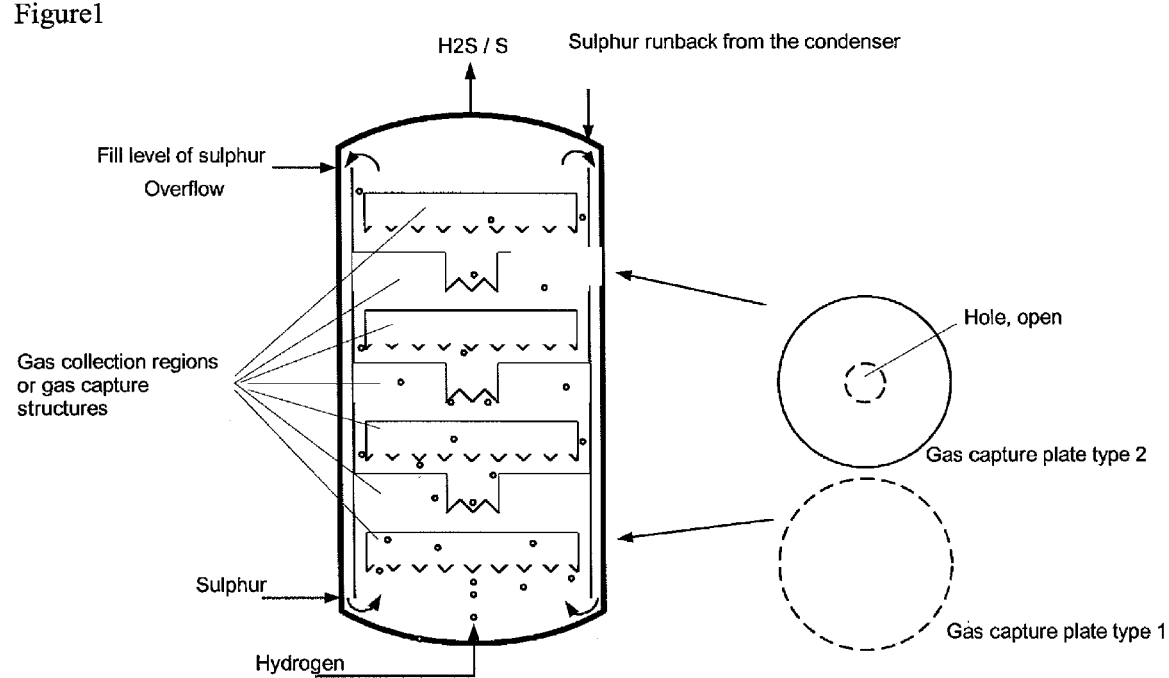
FIG. 1 shows an example of an embodiment.

A person skilled in the art can make a free choice of the process steps to be combined for the preparation of hydrogen sulphide, with a plurality of reaction vessels according to the invention and various apparatuses for separating off by-products or unconsumed starting materials also being able to be combined.

In general, the process is carried out at a pressure of from 5 to 20 bar and hydrogen is passed at this pressure into liquid sulphur in the reaction vessel of the invention.

Furthermore, the reaction according to the invention, in particular to form hydrogen sulphide, can, according to the invention, also proceed in the presence of a heterogeneous catalyst known per se. This is preferably a sulphur-resistant hydrogenation catalyst which preferably comprises a support such as silicon oxide, aluminium oxide, zirconium oxide or titanium oxide and contains one or more of the active elements molybdenum, nickel, tungsten, iron, vanadium, cobalt, sulphur, selenium, phosphorus, arsenic, antimony and bismuth. The catalyst can be used either in the liquid phase or in the gas phase. The catalyst can be present in the form of beds of pellets, as powder suspended in the liquid sulphur, as coating on packing elements, monoliths or knitteds. The catalyst can be located at one or more places in the reaction vessel. The catalyst is preferably located in the internals acting as gas collection regions. To ensure complete conversion of hydrogen, a catalyst bed is, in a further embodiment of the invention, installed above the liquid sulphur and all gas capture structures. A catalyst bed enclosed by the liquid sulphur is also possible.

Instead of pure hydrogen, it is also possible to pass impure hydrogen through the liquid sulphur. The impurities can be, for example, carbon dioxide, hydrogen sulphide, water, methanol, methane, ethane, propane or other volatile hydrocarbons. Preference is given to using hydrogen having a purity of from >65% by volume to 100% by volume, and from >98% to 100% by volume of the hydrogen used being converted into hydrogen sulphide. The impurities in the hydrogen or their reaction products are preferably not separated off before the synthesis of methyl mercaptan but left in the starting mixture. The sulphur used can also contain various impurities.

Overall, the invention can firstly make more economical operation of production plants for hydrogen sulphide possible, especially at pressures of >5 bar, since the reaction vessel requires little maintenance and repairs and does not have to be partly or completely replaced even after prolonged operation over a number of years or decades. As a result of the reaction vessel according to the invention, the occurrence of overtemperatures on pressure-bearing parts is avoided and the plant safety is increased thereby because reduced corrosion in this region minimizes the risk of material failure and the probability of accidents due to loss of containment of hazardous materials. This is of particular importance in the case of very toxic materials such as hydrogen sulphide.

Comparative Example 1

1000 standard l/h of hydrogen were fed continuously via a frit at the bottom into a tube which had an internal diameter of 5 cm and was filled with liquid sulphur to a height of 1 m. The consumption of sulphur was compensated for by introduction of further liquid sulphur so as to keep the fill level constant. Sulphur separated off from the product gas stream by condensation was recirculated in liquid form to the upper region of the tube. Wall thermocouples for measuring the temperature were installed at intervals of 10 cm above the liquid sulphur. While the reactor was being heated electrically to 400° C. via the outer wall, a uniform temperature of about 397° C. prevailed within the sulphur. However, the thermocouples above the sulphur indicated a maximum temperature of 520° C. Furthermore, new samples of conventional stainless steel (1.4571) were placed at the position of maximum temperature above the liquid sulphur. After an operating time of about 400 h, the steel samples were taken out and displayed severe corrosion phenomena in the form of flaking and weight loss.

Comparative Example 2

Comparative example 1 was repeated but the height of the liquid sulphur was increased to 4 m. The value of the maximum temperature above the liquid sulphur remained the same. Severe corrosion phenomena likewise occurred on the steel samples.

Comparative Example 3

Comparative example 2 was repeated with 15% by weight of a pulverulent $Co_3O_4MoO_3/Al_2O_3$ catalyst being suspended in the liquid sulphur. The value of the maximum temperature above the liquid sulphur remained the same. Severe corrosion phenomena likewise occurred on the steel samples.

Example 1

Comparative example 2 was repeated with three gas collection regions in the form of upturned cups being installed in the region of the liquid sulphur. There, the ascending gas was collected with a residence time in the range of 10-50 s. The temperature measured above the liquid sulphur was the same as that in the liquid sulphur. No overheating was observed. Furthermore, no corrosion phenomena could be discerned on the steel samples above the liquid sulphur. The conversion of hydrogen in the product gas was determined by means of GC analysis and found to be >60% (at a sulphur temperature of 400° C., analogous to the comparative example), >90% at 420° C. and >96% at 440° C.

Example 2

Comparative example 2 was repeated with a bed of ceramic packing elements having an external diameter of 5 mm and a gap volume of the pellets of 70% being installed in the region of the liquid sulphur. The value of the maximum temperature above the liquid sulphur was only 5° C. above the set sulphur temperature of 397° C. Furthermore, no corrosion phenomena could be discerned on the steel samples above the sulphur. The conversion of hydrogen in the product gas was determined by means of GC analysis and found to be >99%.

The examples show that, as a result of the invention, the strongly exothermic reaction is complete within the region of the internals or gas collection regions filled with liquid sulphur and does not occur in the gas region above the liquid sulphur. As a result, no corrosion due to high overtemperatures occurs there. The hydrogen sulphide formed is of high purity.

The invention claimed is:

1. Reaction vessel suitable for carrying out an exothermic reaction of a liquid reactant with one or more gaseous reactants to form a gaseous reaction product at elevated temperature and elevated pressure, wherein the residence time of the gaseous reactant(s) in the reaction vessel is increased by non-pressure-bearing internals and the non-pressure-bearing internals are surrounded by the liquid reactant, and wherein the internals are surrounded by the liquid reactant and are separated by a wall from the wall of the reaction vessel so that the liquid reactant circulates through the space formed by the spacing between the said walls in the opposite direction to the direction of ascent of the gaseous reactant.

2. Reaction vessel according to claim 1, wherein the heat of reaction evolved is removed via the circulating liquid reactant.

3. Reaction vessel according to claim 1, wherein gas collection regions and gas capture regions are used as non-pressure-bearing internals.

4. Reaction vessel according to claim 1, wherein beds of packing elements or hollow bodies are used as non-pressure-bearing regions.

5. Reaction vessel according to claim 1, wherein the residence time of the gaseous reactant(s) is increased by means of beds of suitable catalysts.

6. Reaction vessel according to claim 1, wherein the catalyst is located within the gas collection region.

7. Reaction vessel according to claim 1 which contains from three to 100 non-pressure-bearing internals.

8. Reaction vessel according to claim 1, wherein the residence time of the gaseous reactant(s) in a gas collection region or gas capture region is from >0.5 to 60 s.

9. Reaction vessel according to claim 1, wherein the residence time of the gaseous reactant is increased by a factor of from 3 to 20 compared to vessels without internals.

10. Reaction vessel according to claim 1 used for the reaction of liquid sulphur with gaseous hydrogen to form hydrogen sulphide.

11. Process for the exothermic reaction of a liquid reactant with one or more gaseous reactants to form a gaseous reaction product at elevated temperature and elevated pressure in a reaction vessel, wherein the residence time of the gaseous reactant(s) in the reaction vessel is increased by non-pressure-bearing internals and the non-pressure-bearing internals are surrounded by the liquid reactant, and wherein the internals are surrounded by the liquid reactant and are separated by a wall from the wall of the reaction vessel so that the liquid reactant circulates through the space formed by the spacing between the said walls in the opposite direction to the direction of ascent of the gaseous reactant.

12. Process for preparing hydrogen sulphide from sulphur and hydrogen under elevated pressure, wherein the reaction of gaseous hydrogen and liquid sulphur is carried out in a reaction vessel according to claim 1 at a temperature of from 300 to 600° C., with the temperature at the non-pressure-bearing internals being above the temperature at the pressure-bearing wall of the vessel.

13. Process according to claim 12, wherein the temperature of the non-pressure-bearing internals is >450° C. and that at the pressure-bearing wall of the vessel is <450° C.

14. Process according to claim 12 carried out at a pressure of from 8 to 20 bar.

15. Process according to claim 12, wherein the reaction is carried out in the presence of a catalyst.

16. Process according to claim 14, wherein a sulphur-resistant hydrogenation catalyst is used.

17. Process according to claim 16, wherein the sulphur-resistant hydrogenation catalyst comprises a support.

18. Process according to claim 17, wherein the support is made of silicon oxide, aluminium oxide, zirconium oxide or titanium oxide and contains one or more of the active elements molybdenum, nickel, tungsten, iron, vanadium, cobalt, sulphur, selenium, phosphorus, arsenic, antimony and bismuth.

* * * * *